Dec. 1, 1959 C. P. SMITH ET AL 2,914,900

HEATER TRAYING DEVICE

Filed Sept. 29, 1958 11 Sheets-Sheet 1

INVENTORS
CHARLES P. SMITH
JAMES N. SMITH
BY Michael Hertz,
ATTORNEY

Dec. 1, 1959 C. P. SMITH ET AL 2,914,900

HEATER TRAYING DEVICE

Filed Sept. 29, 1958 11 Sheets-Sheet 2

INVENTORS
CHARLES P. SMITH
JAMES N. SMITH

BY Michael Hertz

ATTORNEY

INVENTORS
CHARLES P. SMITH
JAMES N. SMITH
BY Michael Hertz,
ATTORNEY

HEATER TRAYING DEVICE

Filed Sept. 29, 1958 11 Sheets-Sheet 4

INVENTORS
CHARLES P. SMITH
JAMES N. SMITH

BY Michael Hertz,
ATTORNEY

Dec. 1, 1959 C. P. SMITH ET AL 2,914,900

HEATER TRAYING DEVICE

Filed Sept. 29, 1958 11 Sheets-Sheet 5

INVENTORS
CHARLES P. SMITH
JAMES N. SMITH

BY Michael Hertz,
ATTORNEY

INVENTORS
CHARLES N. SMITH
JAMES P. SMITH

BY Michael Hertz,
ATTORNEY

INVENTORS
CHARLES P. SMITH
JAMES N. SMITH

BY Michael Hertz,
ATTORNEY

INVENTORS
CHARLES P. SMITH
JAMES N. SMITH

BY Michael Hertz,
ATTORNEY

HEATER TRAYING DEVICE

INVENTORS
CHARLES P. SMITH
JAMES N. SMITH

BY Michael Hertz,
ATTORNEY

HEATER TRAYING DEVICE

Filed Sept. 29, 1958 11 Sheets-Sheet 10

INVENTORS
CHARLES P. SMITH
JAMES N. SMITH

BY Michael Hertz
ATTORNEY

INVENTORS
CHARLES P. SMITH
JAMES N. SMITH
BY Michael Hertz,
ATTORNEY 2,914,900

HEATER TRAYING DEVICE

Charles P. Smith, Towanda, and James M. Smith, Emporium, Pa., assignors, by mesne assignments, to Sylvania Electric Products Inc., Wilmington, Del., a corporation of Delaware Application September 29, 1958, Serial No. 763,984

7 Claims. (Cl. 53—160)

The invention relates to tray filling and stacking mechanism.

In particular it relates to a machine which removes a tray from a stack of trays and feeds it to a filling station whereat the tray is indexed in two horizontal directions at right angles to each other to sequentially fill holes in the tray with wound and folded heater wires and which feeds the filled tray into a tray storage rack.

It is an object of the invention to provide a simple efficient mechanism to accomplish the functions above described.

In general, the machine operates to transfer a stack of trays deposited by an operator upon a set of horizontal tracks onto a loading elevator in back of the tracks, the elevator then rising and stopping when the top tray is at a given elevation and when the tray is within the sphere of action of a lift fork. As needed, this lift fork removes a top tray from off the stack on the elevator and transports it through a pair of tiltable rails upon which the tray will index longitudinally. In the meantime, the elevator rises to bring the next tray on the elevator to the given height, the fork in the meantime also sinking to be ready to lift the new top tray as needed. The pair of tiltable rails are mounted in a rectangular frame which indexes laterally a number of steps and then reversely indexes. As a result of the indexing movement of the tray along the tiltable rails and the movement of the rectangular frame and tray laterally, equally spaced apertures or compartments in the top of the tray arranged in rows and columns are each brought to a definite fixed position with respect to the base of the machine and in a position to be loaded with articles, one by one. The movement of the tray itself is in a square wave path and when the last aperture has been filled, the tray is moved to a position wherein it is under a full tray receiving rack and is pushed up into the receiving rack lifting up in the rack all those previously placed therein. As the tray is loaded into the receiving rack, the lifting fork places another tray on the tiltable tracks ready for loading, and loading in this tray begins. This cycle is repeated until all of the trays on the elevator have been unloaded whereupon the elevator rises to a greater height and operates mechanism to cause it to descend for receipt of another load of trays and again rises ready for the fork to transfer another tray onto the tiltable tracks. While the elevator is going through this excursion, the tray last placed on the tiltable tracks is being indexed in two directions and filled with articles.

Figures 3, 4:
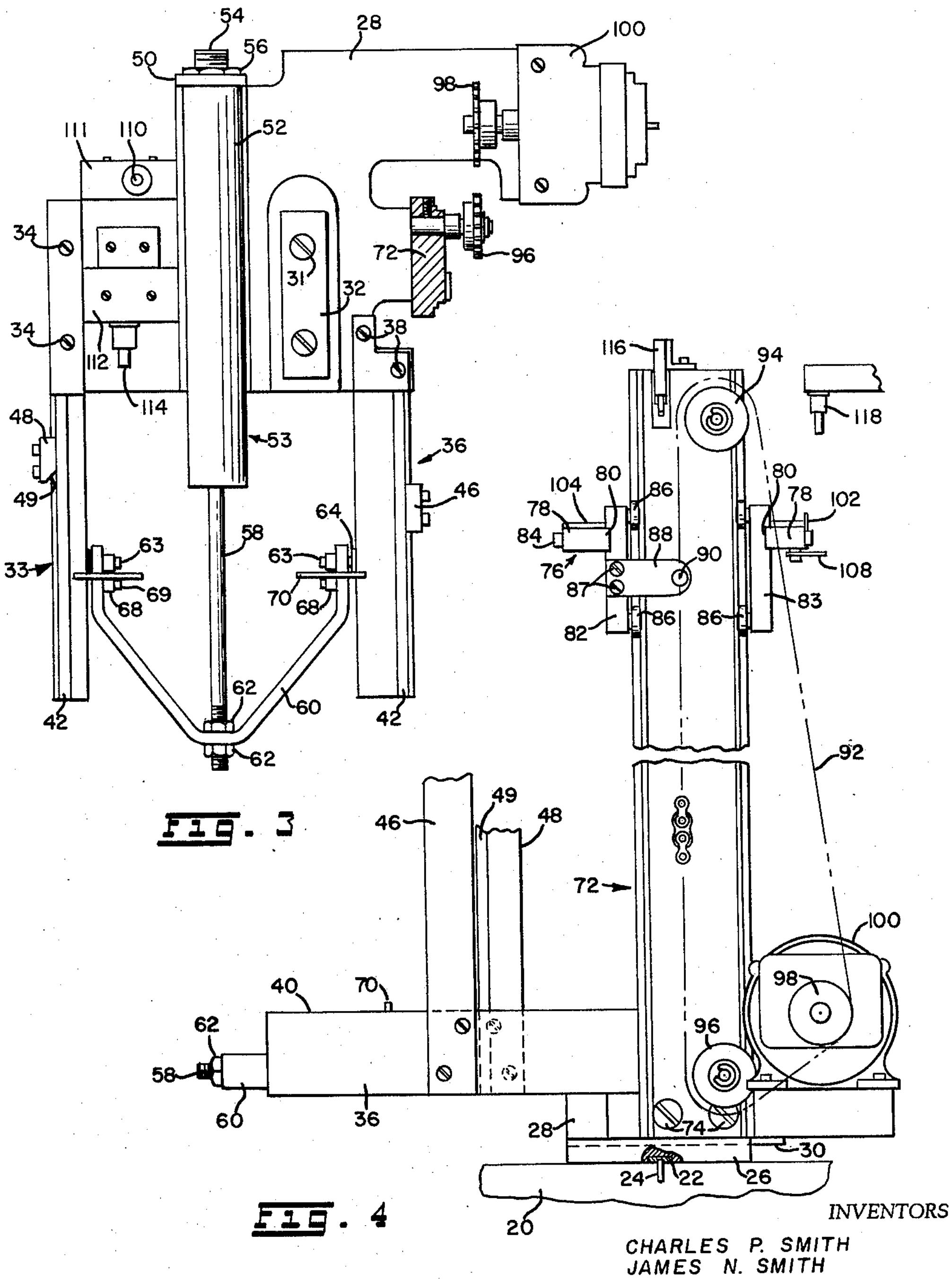
Fig. 3 is a section on the line 3—3 of Fig. 2.
Fig. 4 is a side elevation of the elevator.
Figure 12:
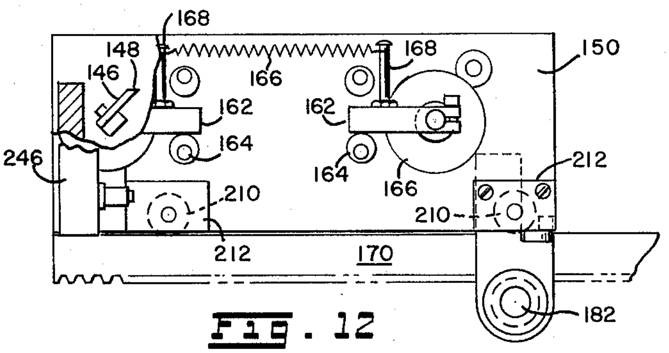
Fig. 12 is a view of the mechanism of Fig. 11 with parts removed.

Now referring to the drawings with greater particularity, at 20 is a floor structure to which is fastened a key 22 by means of dowel pins 24 to provide a guide for a keyway in the bottom of a base plate 26 so as to allow the plate to be adjusted in one direction with respect to the floor and then fastened to the floor in any suitable manner. Slidably fixed with respect to the base plate in a direction at right angles to the direction of adjustment movement of the base plate is a mounting plate 28, the motion being limited to rectilinear movement by a key 30 lying in grooves in the base plate and mounting plate. The mounting plate 28, see Fig. 3, is held in adjusted position relative to the base plate by any well known means as by screws 31 passing through a washer plate 32 in a recess in the base plate, through large openings in the mounting plate, and threaded into the base plate. A track or rail 33 is fastened atop the mounting plate by means of screws 34. A second parallel track or rail 36 is fastened on the mounting plate by screws 38, the tracks have upstanding walls 40 and riding surfaces 42 to accommodate trays 44 placed with the long dimension between the walls 40. Fastened to the side of the right hand track is a guide 46 adapted to assist an operator loading the bottommost of a stack of trays onto the riding surface 42 of the rail and fastened to the side of the left hand track nearer the back of the machine is another bevelled guide 48, bevelled as at 49 along a vertical edge, to thrust the trays to the right should they not ride properly atop the riding surfaces 42 of the tracks 32 and 36 as they are advanced to an elevator platform, as will be described.

Mechanism is provided to thrust a stack of trays which are placed on the tracks toward and onto an elevator platform. For this purpose the base plate 28, see Fig. 3, has fastened to it a vertically adjustably positioned cylinder bracket 50, against which is held a long horizontal cylinder 52 of a fluid motor 53, as by a shouldered threaded portion 54, the end of the cylinder passing through a hole in the bracket and held in place by a lock nut 56. The free end of the piston rod 58 of the motor is threaded and passes through the midportion of a horizontal tray moving yoke 60 and is fastened thereto by hexagonal nuts 62. The free ends of the yoke are provided with pins 63 on which are held rollers 64 riding in ways 66 in the sides of the tracks to properly guide the yoke in its movement. Also upstanding from the free ends of the yoke and fastened thereto are tray pushers consisting of vertical arms 68 held to the yoke ends by screws 69 and cross arms 70 welded or otherwise secured to the vertical arms, the cross arms being at an elevation slightly above the surfaces 42 so as to be able to thrust broadside against the lowermost tray of a stack of trays placed on the tracks.

At a side of the mounting plate 28 is a vertical track 72 held to the plate by means of screws 74. Riding on the vertical track is a horizontal elevator platform 76 having a forked end with a tine 78 thrust into a groove 80 of a front plate 82 and a second tine similarly thrust into a groove in a rear plate 83, the tines being fastened to the plates by screws 84. These front and rear plates provide support for rollers 86 which ride against opposite sides of the vertical track 72 to provide a good support for the platform. Fastened to the plate 82 by screws 87 and extending toward the plate 83 is a chain strap 88 having a screw 90 threaded into one of the links of an endless chain 92 so that the platform 76 may be raised and lowered in accordance with the travel of the chain. The chain is passed over a pair of idler gears 94 and 96 suitably rotatably mounted at the top and bottom of the vertical track and over a drive gear 98 fixed on the shaft of an air cooled geared down motor 100. When the platform is lowered by chain operation, it is stopped with the lower surface almost resting on the cylinder 52 and with the upper surface below the level of the tray riding surfaces 42 of the tracks. Consequently when the tray pusher arms 70 move toward the rear of the machine, the stack of trays on the tracks will be pushed onto the elevator platform 76 and up against a pair of stop blocks 102 affixed to the rear side of the platform. An end plate 104 extending above the level of the platform prevents accidental movement of the trays toward the left side of the platform. The top surface of the platform is slightly undercut between its ends as indicated at 106 to reduce the area of rubbing action of the trays on the platform. Mounted against the lower surface of the platform and at the rear edge thereof is a switch tapper 108 which as will be described controls the reversal of the motor 100 when the platform is at the extreme upper position, the reversal of the motor lowering the platform for receiving a new stack of trays.

When the platform approaches its lowermost position, the underside engages and thrusts downwardly an electric circuit closing plunger 110 of a switch 111 mounted on the plate 28 which then effects the stoppage of the motor 100 and simultaneously initiates the cycle of the fluid motor 53 to cause the pushers to thrust a stack of trays onto the elevator platform. Also mounted on the plate 28 is a switch 112 with a plunger 114 in the path of movement of one of the pins 63 so that as the yoke 60 approaches the plate 28, the switch 112 is actuated to simultaneously reverse the motor 53 to move the pushers to initial position and initiate the movement of motor 100 in a direction to raise the platform. Obviously the switch 112 could be in the path of the stacked trays, if desired, and be actuated by a tray rather than by the pins 63. The motor is stopped when the top tray of a stack contacts and opens a micro switch 116 mounted atop the track 72. Each time a top tray is removed from the stack, as will be described, the switch 116 will be closed to set the motor 100 into operation to lift the elevator the height of one tray and until it is again stopped by the new top tray engaging the switch. When the last tray has been removed, the elevator platform rises sufficiently so that the tapper 108 engages and closes another switch 118 fixedly mounted on the machine, whereupon the motor 100 is reversed and the elevator platform descends to initiate a repetition of the cycle just described.

Figure 8:
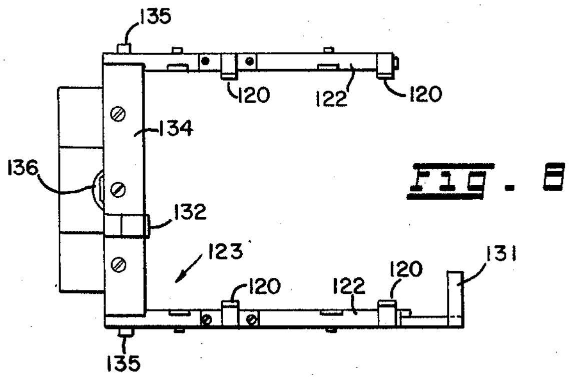
Fig. 8 is a plan view of the transfer fork.
Figure 6:
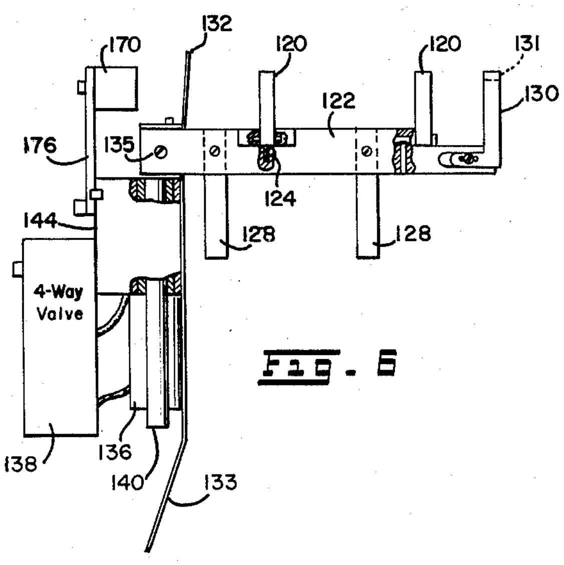
Fig. 6 is a front elevation of a transfer fork.
Figure 7:
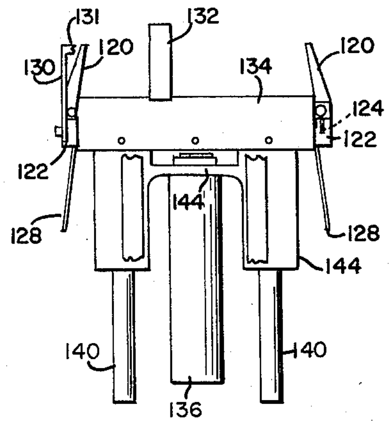
Fig. 7 is a side elevation thereof.

On the rise of the elevator platform, see Figs. 6 to 8, shoulders or lips 126 on the top tray force their way past pairs of pivoted catches 120 on a pair of parallel tines 122 of a transfer fork 123. The switch 116 previously referred to is located so that it is open when the shoulders of a tray just clear the top of the catches and when the tines 122 are in a normal lowered position, as will be described. The catches are spring pressed to the positions shown in Fig. 7 by springs 124, Figs. 6 and 7, reacting between the tines and flat bases of the catches, the upper flat edges of the catches coming to rest against the vertical face of the tray below the shoulders or lips 126 thereof. The tray is guided into its proper position by upwardly converging guides 128 fastened to the tines and extending downwardly therefrom. An adjustable end piece 130 with bent backward stop 131 limits undue movement of the tray to the right. A second pair of end guides 132 and 133, fastened to a bridge 134 across the tines, extend above and below the tines and function to guide the tray against the stop 131. The tines 122 are fastened at their ends to the bridge 134 by screws 135 and the assembled bridge and tines are reciprocated by a fluid motor 136 under control of a fourway valve 138 conduit connected to the motor. The piston of the motor is secured to the bridge which also has depending from it two guide rods 140 riding in slide bushings 142 in a fixed machine support 144.

The motor 136 is energized to raise an empty tray by means of the catches 120, as a previous, loaded, tray reaches a final unloading position to the right of the machine, as will be described. When the fork is lifted by the motor, the tray shoulders are forced past a pair of tiltable tracks, described below, and come to rest on these tracks for sliding movement therealong. Referring to Figs. 9 to 12, there is shown a pair of tiltable tracks 146, which move back to the position shown in Fig. 12 after the shoulders of the tray have passed the tracks, the tray dropping onto the bevelled upper surfaces 148 of the tracks as the fork 123 moves downwardly to allow the catches 120 to be in position, on upward movement of the fork to engage a new tray. The tiltable tracks thereafter allow the trays to slide along the bevelled surfaces.

Figure 11:
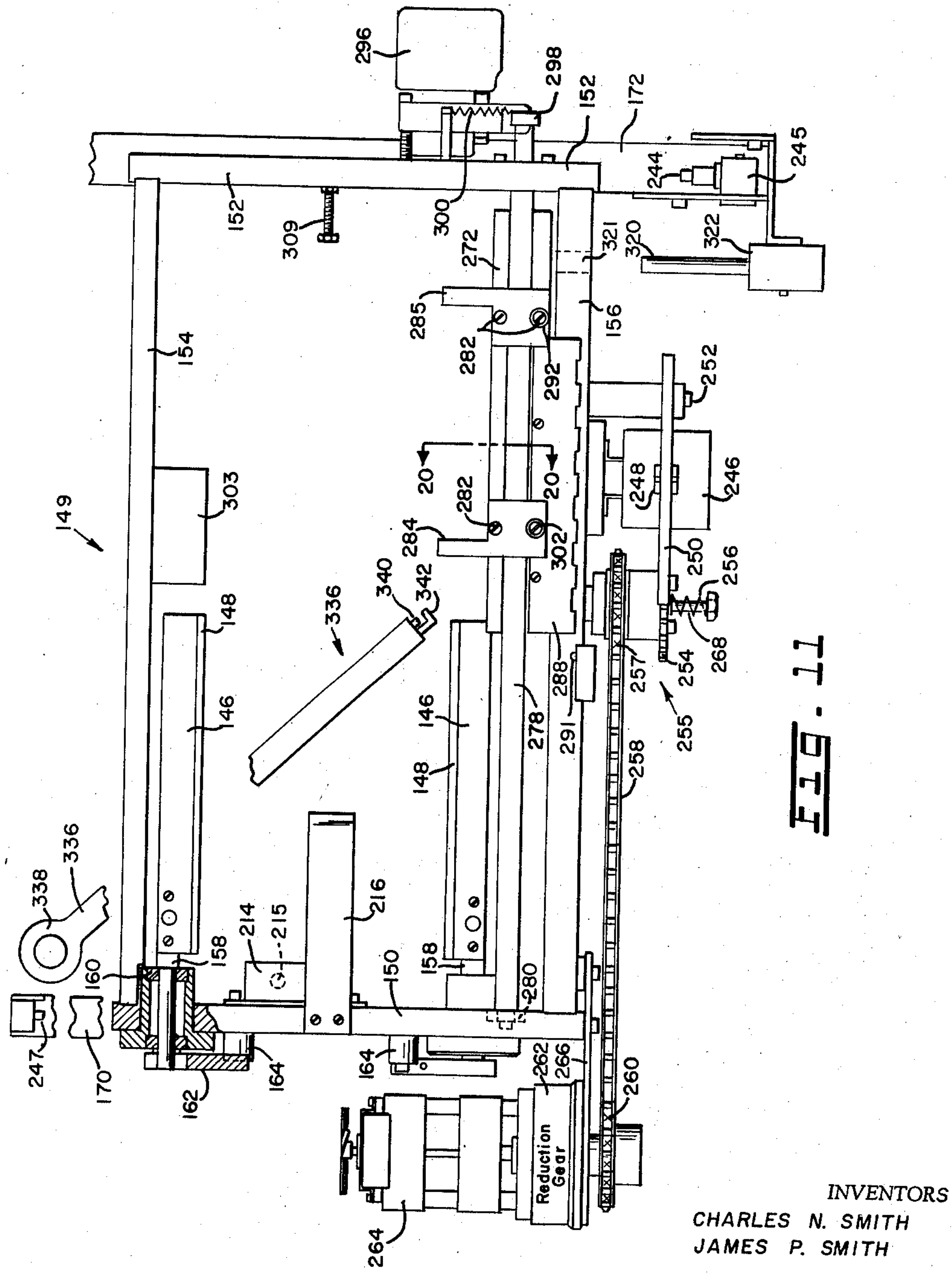
Fig. 11 is a plan view of the mechanism shown in Fig. 9 with parts removed for the sake of clarity.

The tiltable tracks are supported in a rectangular frame 149, Fig. 11, comprised of a left hand end plate 150, a right hand end plate 152, a rear side plate 154 and a front side plate 156, all suitably fastened together to form a hollow rectangular frame. Each of the tiltable tracks is pivoted to this frame by means of a stepped stub shaft 158, to which the track is secured, the stub shafts being oscillatable in bearings 160 fastened in the end plate 150. The oscillation of each track is limited by an arm 162, Fig. 12, fastened to the shaft, the arm playing between a pair of adjustable eccentric stops 164 mounted on the outer face of the end plate 150. The tracks are moved to their normal rest positions with the bevelled surfaces in one plane by a spring 166 stretched between a pair of pins 168, each pin being suitably secured in an arm 162.

Figures 9, 10, 16:
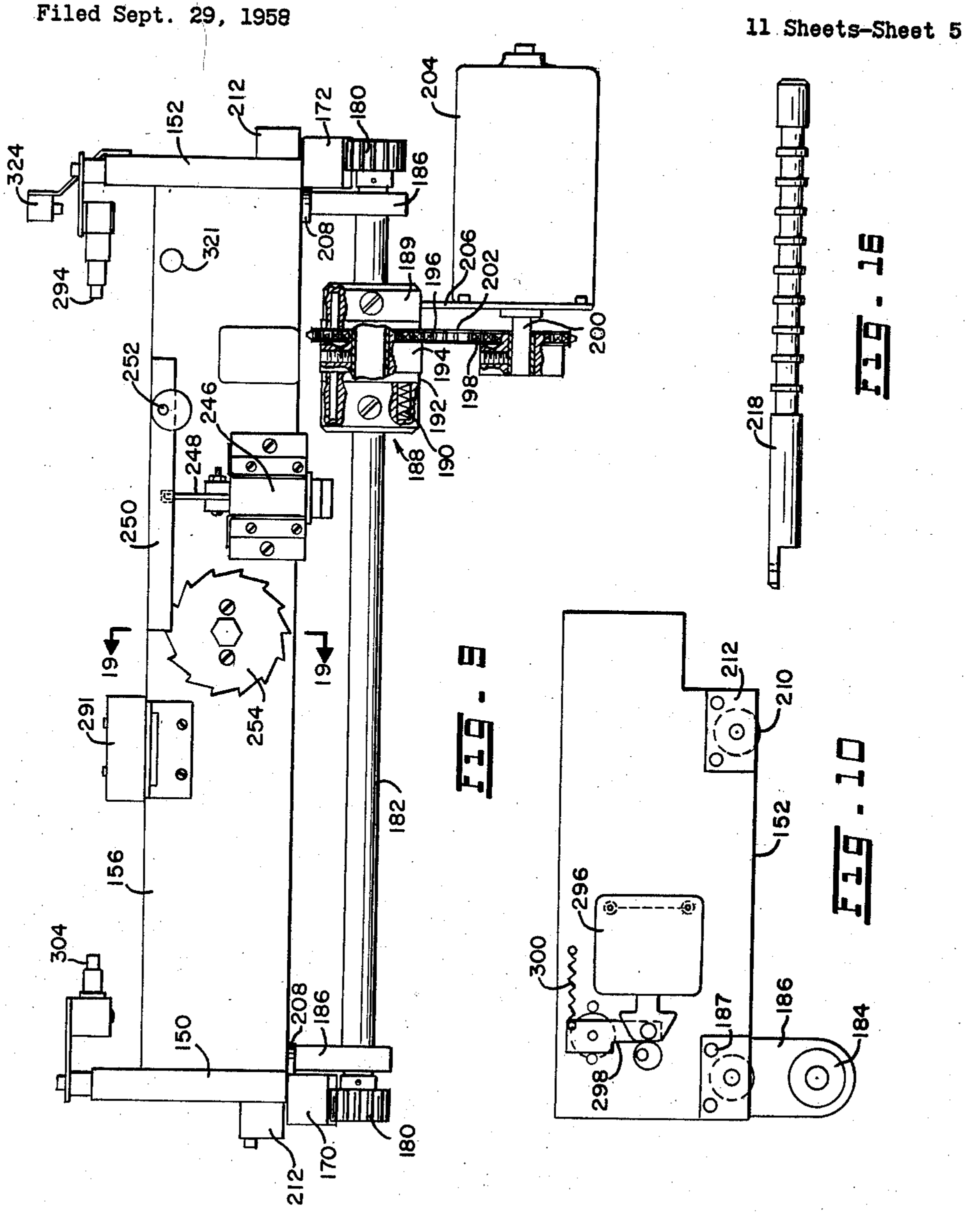
Fig. 9 is an elevation of a mechanism for indexing a tray in a horizontal plane.
Fig. 10 is a right hand end view of Fig. 9.
Fig. 16 is a view of a rod used to control indexing movement of a frame supporting the tray.

The rectangular frame itself, see Figs. 9 and 11, is indexed backward and forward in a direction parallel to its end plates 150, 152 by the following mechanism: The rectangular frame rides atop a fixed subframe 169, see Figs. 13 to 15, comprised of a left hand rack bar 170, a right hand rack bar 172 and a rear connecting bar 174, the last being suitably fastened to a fixed part of the machine. The rack bars are suitably supported in horizontal position by a support plate 176 fastened to the rack bar 170 and to the machine support 144 and by a support plate 178 fastened to the rack bar 172 and to a fixed part of the machine. The rack teeth on bars 170 and 172 are on the undersurfaces of the bars and mesh with a pair of pinions 180, see Fig. 9, fastened to the ends of a shaft 182 mounted in bearings 184 in a pair of hangers 186 depending from the inner sides 150 and 152 of the rectangular frame. The hangers are held to the sides by screws 187 or the like passing through the upper extensions of the hangers. The shaft is driven through a conventional friction clutch 188 here illustrated as comprising clutch discs 189 which are fixed on the shaft 182 and which by means of springs 190 hold clutch plates 192 against a gear hub 194 integral with a sprocket 196, the sprocket being driven by a second sprocket 198 fixed on a shaft 200, the two sprockets being connected by a loose sprocket chain 202. The shaft 200 is driven by a continuously rotating motor 204 which is supported by a plate 206 fixed on a part movable with the rectangular frame, as described later. The rectangular frame is guided in its movement along the rack bars by roller bearings 208 mounted on the frame and bearing against the inner side faces of the rack bars. The movement of the frame on the rack bars is facilitated by the provision of a roller bearing 210 at each end of the lower edges of the end plates 150 and 152, these roller bearings being held in cages 212 fastened to the exterior faces of the end plates. Mounted on the inner face of end plate 150 is a switch block 214 having a switch plunger 215 directed downwardly into the path of movement of the bridge 134 of the transfer fork. As the fork reaches its upper position wherein it forces the shoulders of a tray past the tiltable tracks, the upper surface of the bridge 134 thrusts against the plunger 215 in order to effect reversal of the motor 136. A tray hold down spring 216 fastened to the top of end plate 150 engages the top of the tray as it is pushed through the tiltable tracks by the upwardly moving fork to prevent undue movement of the tray.

Figure 13:
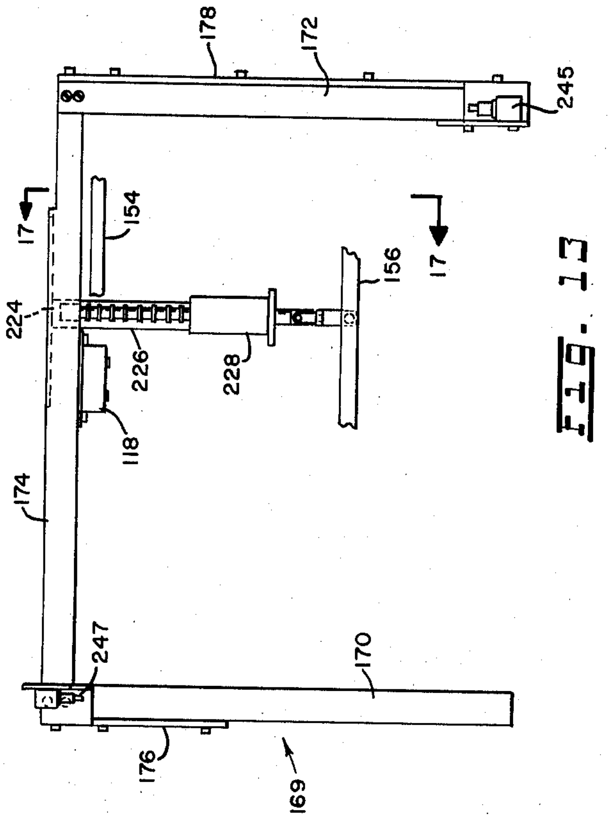
Fig. 13 is a top plan of a rack supporting the mechanism of Fig. 9.
Figure 14:
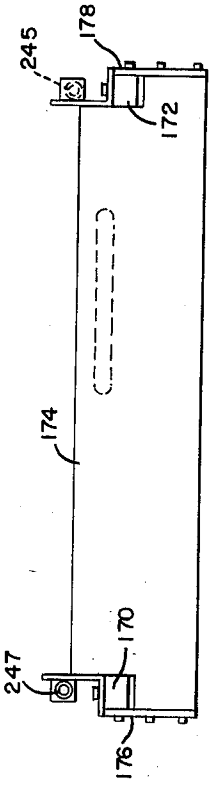
Fig. 14 is a front elevation of the rack.
Figure 15:
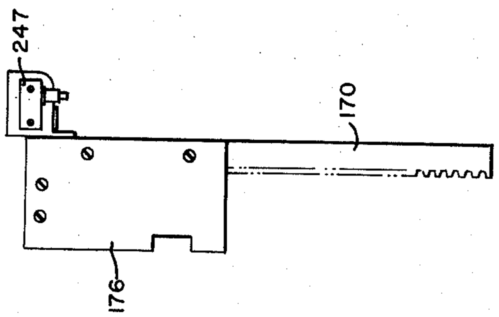
Fig. 15 is a left hand elevation of the rack.
Figure 17:
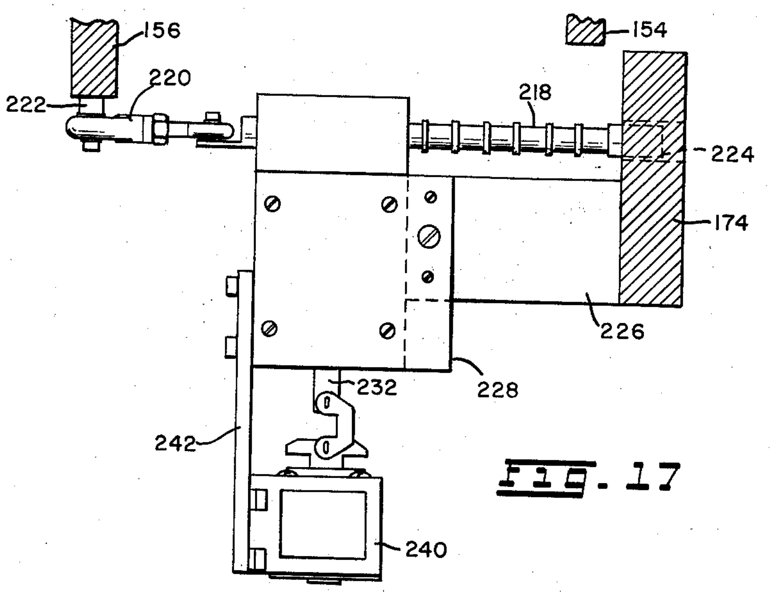
Fig. 17 is a view looking in the direction of the arrows 17—17 in Fig. 13.
Figures 18, 26:
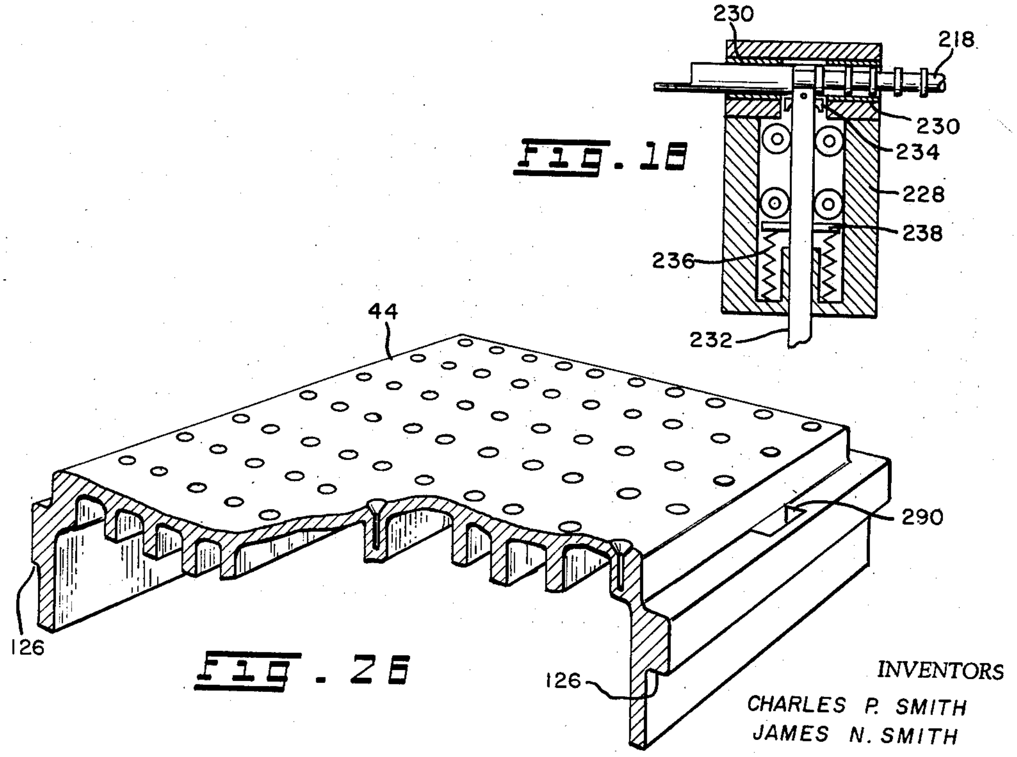
Fig. 18 is a detail of a holding electromagnet.
Fig. 26 is a perspective view of a tray handled by the machine, parts being broken away.
Figure 20:
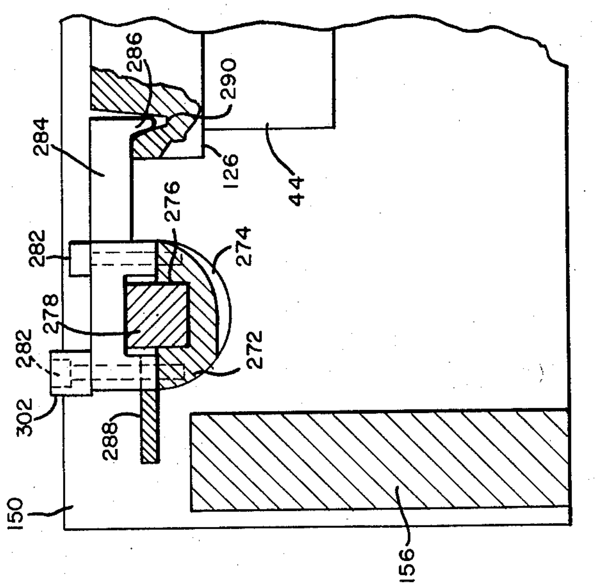
Fig. 20 is a section on the line 20—20 of Fig. 11.
Figure 19:
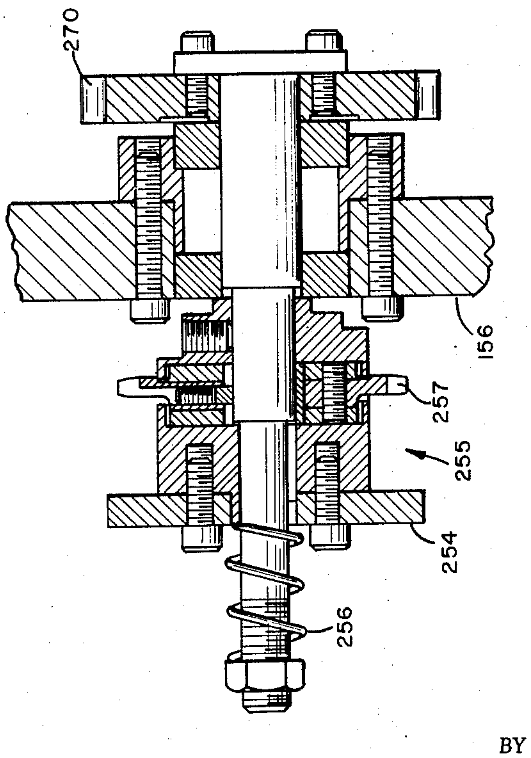
Fig. 19 is a section on the line 19—19 of Fig. 9.
Figure 21:
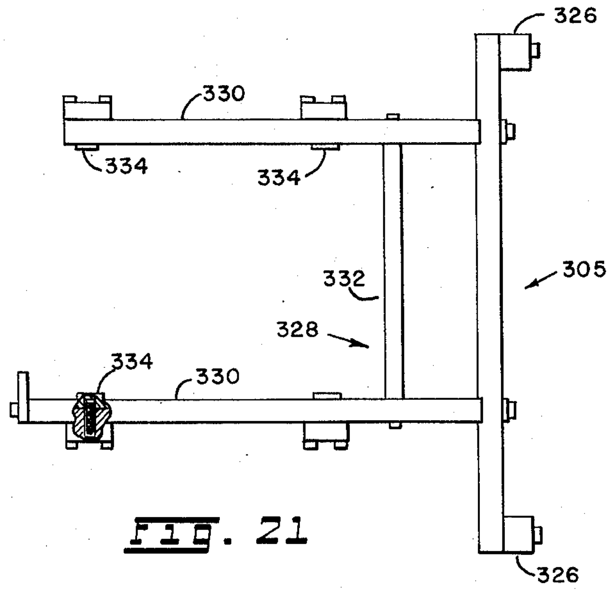
Fig. 21 is a plan view of a filled tray storage rack.
Figure 22:
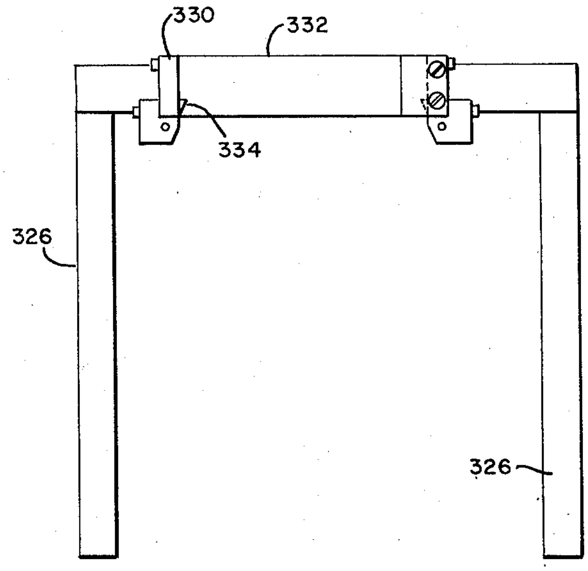
Fig. 22 is a side elevation of the storage rack.

To limit the forward and backward movement of the rectangular frame to an indexing movement, there is provided a stepped rod 218, see Figs. 11, 13, 16, 17 and 18, pivoted at its forward end to a bearing 220 pivoted on a pin 222 carried by the lower face of the front plate 156 of the rectangular frame. The rear end of the rod 218 may come to rest freely in an aperture 224 in the connecting bar 174, when the rectangular frame is fully projected rearward. Fastened to the front face of the bar 174 is a block 226 to the front end of which is secured a travel stop housing 228 with spaced bushings 230 to accommodate the stepped rod 218. The rod is pivotally mounted, as previously described, to prevent binding of parts as the rod with the rectangular frame moves relatively to the fixed travel stop housing. Reciprocatably mounted in the housing for vertical movement in directions perpendicular to the stepped rod is a plunger 232 with a pivoted pawl 234 at its rod engaging end, the pawl falling in between steps in the rod as the plunger after being first withdrawn is released to the action of springs 236 reacting against the stop housing and a cross bar 238 passing through the plunger. Each time the pawl on the plunger is withdrawn from the stepped rod, the rectangular frame, being under constant bias to move forwardly or backwardly due to the constant urge of the motor 204, will be moved one step. The plunger is withdrawn by an electromagnet 240 mounted on a plate 242 extending from the stop housing, the electromagnet being momentarily energized by a cam controlled switch (not shown) on a heater forming and heater transfer machine, to be referred to later, the cam being operated in timed sequence with that machine. This stepping forward of the rectangular frame and the tray carried thereby continues until all compartments or apertures in a front to back row in the tray are loaded with wound heaters. Continued motion of the rectangular frame, see Fig. 11, causes the front end of its right hand end plate 152 to engage a switch plunger 244 of a switch 245 mounted on the forward end of rack bar 172. The effect of closing the switch is to complete a circuit to an electromagnet 246 to control a stepping of the tray on the tracks toward the right for a next front to back row of compartments or apertures to be filled. Referring to Figs. 13 and 15, a second switch 247 in parallel with switch 245 is mounted at the rear end of the left rack bar 170 and similarly effects a side stepping movement of the tray. The movement of the tray laterally toward the right and along the tracks on the rectangular frame is effected under the control of the electromagnet 246. The electromagnet is mounted on the rectangular frame and has a plunger 248 pivotally connected to a pawl or latch 250 pivoted at its end 252 to the frame element 156, the pawl cooperating with teeth on a ratchet wheel 254 constantly urged to move clockwise, see Fig. 11, by reason of a conventional friction clutch 255 having a spring 256 to obtain the friction of parts of the clutch, the clutch being driven by a gear 257, in turn driven by a chain 258 from the drive gear 260, the drive gear being driven through reduction gearing 262 from a continuously operating motor 264, the motor and reduction gear being supported by a strap 266 fastened to the rectangular frame. The ratchet wheel 254 has affixed thereto a rack driving gear 270. The gear 270 meshes with a tray transport rack bar 272, the rack bar having arcuately formed teeth 274 in planes perpendicular to the bar. The rack bar has a longitudinally extending rectangular groove 276 in its upper surface to fit against the square shaft 278, the shaft having cylindrical ends riding in bearings 280 in the end plates of the rectangular frame. Fastened to the upper surface of the rack bar as by screws 282, and spanning the square shaft 278 is a pair of fingers 284 and 285 with downwardly directed free ends 286, the assemblage of fingers and rack bar being slidable along the square shaft. Also secured by the screws 282 to the tray transport rack bar is a stepped switch control plate 288. The downwardly directed ends of the fingers engage in slots 290 in the tray, the slots being of a width slightly greater than the width of the finger ends so that as the fingers are moved laterally toward the right, Figs. 9 and 11, the tray will also be moved along. The movement of the tray is a stepping movement under control of the latch 250 which momentarily releases the ratchet 254 to the action of the drive motor 264, the latch again engaging the ratchet after an initial rotation of the ratchet. The notches and teeth on the plate 288 cooperate with a reversing switch 291 secured to the front plate 156. When the step switch plate 288 moves from the extreme left toward the right, the first raised tooth portion on the plate will engage the switch 291 to effect a reversal of the motor 204 to drive the rectangular frame forwardly under control of the plunger 232. After a first front to back row of compartments in the tray has been filled, the switch plunger 244 will be actuated to energize the electromagnet 246 to allow the ratchet 254 to move another step thereby, through the gear 270 and rack bar 272, moving the plate 288 to the right to a position where a low area on the plate is opposite the reversing switch 291 thus causing the motor 204 to again reverse and drive the rectangular frame to the back under control of the plunger 232 and in step by step fashion, allowing a second back to front row of compartments in the tray to be filled. When the rectangular frame makes another step and reaches its rearmost position, the switch 247 is actuated, this switch thereby, like switch 245, effecting a release of the latch 250 for another shift of the tray to the right. The next high tooth on the plate 288 again reverses the drive to the rectangular carriage, under control of the plunger 232. This cycle repeats until each compartment in the tray is filled in timed relationship with the operation of the heater winding and transfer machine. When the last compartment had been filled and the switch 247 had been closed, ratchet 254 permits rotation of shaft 268 until the rack 272 advances sufficiently for a collar 292 about one of the screws 282 on the finger 285 to engage a switch plunger 294, Fig. 9, fixed atop the right hand end plate 152. The closing of this switch affects the initial operation of the machine by energizing the fluid motor 136 thereby causing the catches 120 on the transfer fork to thrust a top tray on the elevator up between the tiltable tracks. Also the closure of this switch 294 causes a return of the tray support rack bar to its extreme left hand position by the following mechanism: The closure of the switch 294 energizes a solenoid 296, Figs. 10 and 11, which rotates an arm 298 secured to the right hand end of shaft 278. The arm 298 is held by a spring 300 so that the fingers 284 and 285 are normally in engagement with the slots 290 in the tray. Energization of the electromagnet lifts these fingers out enabling the fingers to be moved to the left without pulling the tray with them. Shifting of the fingers to the left is effected by a reversal of the motor 264, also effected by momentary closure of switch 294, the motor 264 continuing the movement of the fingers 284 and 285 to the left and the solenoid 296 remaining energized until a collar 302 on a screw 282 on finger 284 comes into engagement with a switch plunger 304, Fig. 9, mounted atop the left hand end plate 150. Momentary closure of this switch effects deenergization of solenoid 296, allowing the fingers 284 and 285 to engage the slots 290 in the new tray, and reversal of the motor 264 to exert a bias driving the tray to the right, the tray again being moved under control of the ratchet 254 and pawl 250.

Figure 1:
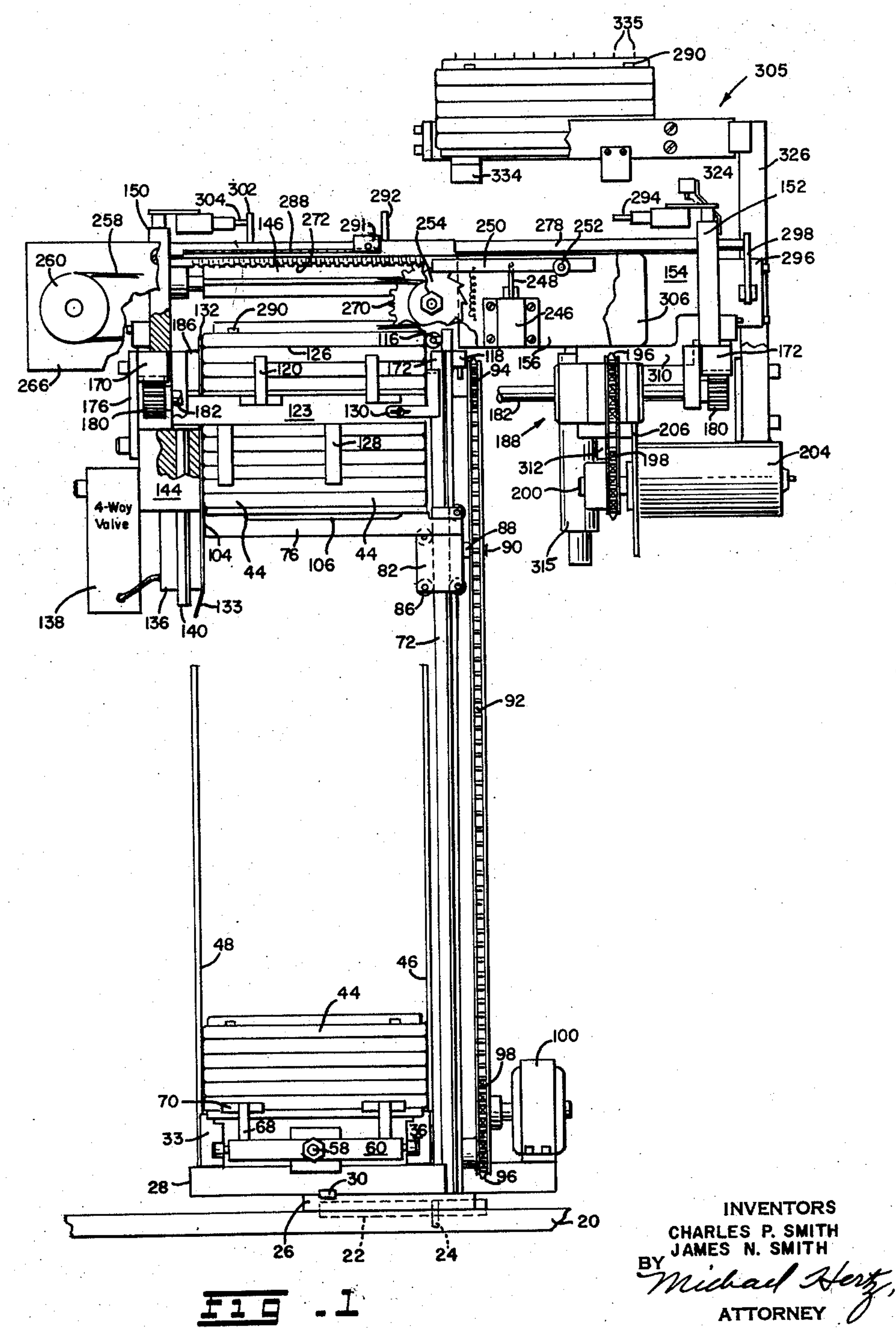
Fig. 1 is a front elevation of the machine.
Figure 2:
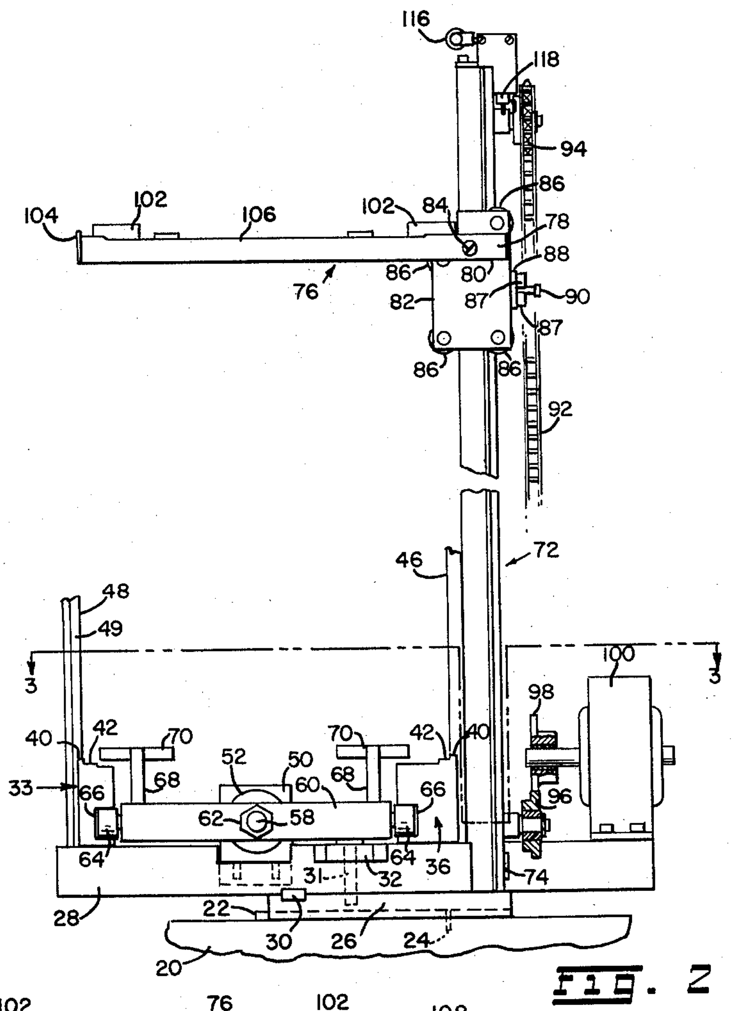
Fig. 2 is a front view of the empty tray loading elevator.
Figure 5:
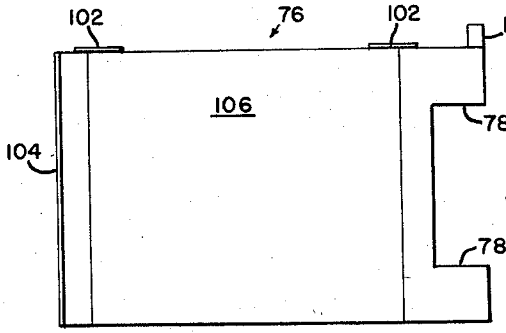
Fig. 5 is a plan view of a platform forming part of the elevator.
Figure 25:
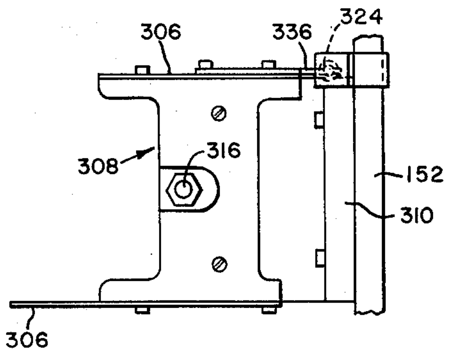
Fig. 25 is a plan view thereof.
Figure 24:
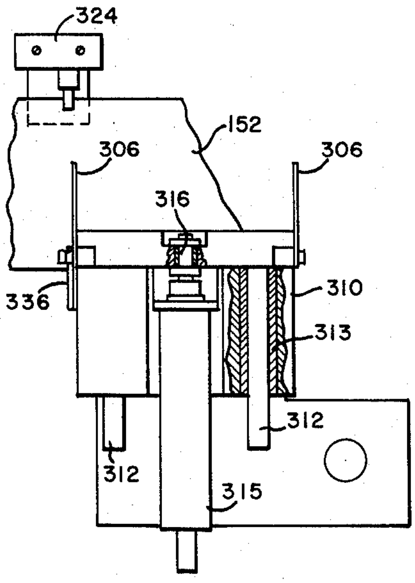
Fig. 24 is a side elevation thereof.
Figure 23:
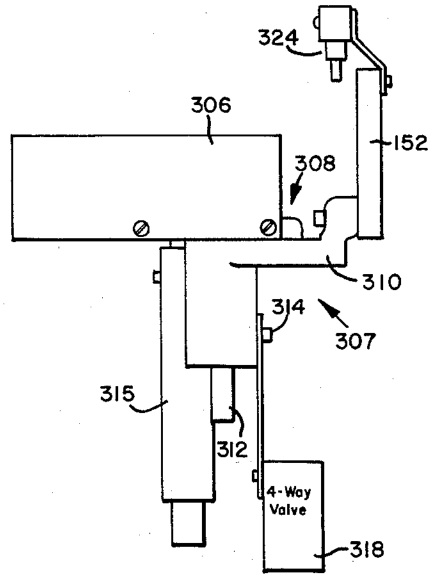
Fig. 23 is a front elevation of a filled tray unloading elevator.

After the tray has been placed on the tiltable tracks, the tray is indexed a number of steps forward or backward in a direction parallel to the end plates 150 and 152. After each completion of a series of forward or a series of backward indexing motions of the tray, the tray is indexed to the right and finally to a position where it will be lifted up into a storage rack 305, see Figs. 23 to 25. As the tray is indexed toward the right it slides off from the tiltable tracks onto a guide block 303 and onto a pair of guide plates 306 of an unloading elevator 307, and finally reaches an adjustable stop pin 309, Fig. 11, on the inner face of the plate 152. The guide plates are mounted on a tray lift 308, the lift being guided for vertical movement with respect to an underlying tray lift bracket 310 by means of a pair of depending guide rods 312 riding in bushings 313 in the bracket. The bracket is mounted on right hand end plate 152 and supports both the plate 206 for the motor 204 as by screws 314 and a fluid motor cylinder 315. Within the cylinder is a piston 316 whose piston rod is connected at its upper end with the tray lift, the cylinder being connected to a four way air valve 318 under control of a tapper 320, see Fig. 11, of a switch 322 mounted on the forward end of rack bar 172 and of a second switch 324, see Figs. 1 and 9, mounted atop the end plate 152. When the tray, fully loaded, has indexed forward, the front face will engage the tapper 320 actuating the switch to cause the four way valve 318 to supply fluid pressure to the lower end of cylinder 315 to lift the tray into the storage rack 305. The storage rack is supported by uprights 326 fixed to the machine and comprises a horizontal rectangular frame work 328 with the parallel bars 330 and a cross bar 332, the parallel bars being provided with spring pressed shouldered catches 334. When a tray on the tray lift is pushed upward, it will engage and push up previously filled trays in the rack, the bottom tray being prevented from moving downwardly by the catches. The filled trays are removed, as needed, through the top of the storage rack by an operator. The trays themselves are hollow on the underside to allow for extension above the top surface of the trays of folded filaments 335 stuck into the apertures in the trays and yet allow stacking of the trays. The tray lift has an arm 336 in the path of movement of switch 324, and, as it rises, the switch is closed to shift the four way valve 318 to reverse the flow of fluid through cylinder 314 to return the tray lift to normal lowered position.

The tray handling mechanism thus far described is designed for use partciularly with a folded filament transfer device associated with a heater wire winding and coil forming machine. It is sufficient to state herein for an understanding of this invention that the heater winding machine forms oblate coils of heater wire out of a coated strand of heater wire and the transfer mechanism being now described compresses these coils, removes them from the winding machine and transfers them into compartments or apertures in the tray. For more complete information attention is directed to the application by James M. Smith, Serial No. 706,058, filed December 30, 1957, and entitled Heater Removing Forming and Gathering Mechanism.

For the purposes of this disclosure it is sufficient to state that the transfer arm here designated as 336 is fixedly mounted on a vertically reciprocable oscillatable sleeve 338 and oscillates so that gathering fingers 340 and 342 move between a position where they grasp and compress a partially folded heater coil from the winding machine to a determined position over the tray handling machine where they release the coil. Thus the fingers oscillate between these two determining positions. To perform the grasping and releasing function, one of the fingers is reciprocated longitudinally of the other by means shown in said previous application, to which reference may be had, if desired. The shaft and sleeve movements are under control of cams on the heater winding machine.

The operation of the tray handling machine, in brief, is as follows: Starting with the machine unloaded, with the elevator platform 76 in the lowermost position, the frame in the rearward position and the yoke 60 in the forward position, the operator places a few stacked empty trays on the platform and a stack of about a dozen trays on the tracks 33, 36 in back of the pushers 70 on the yoke. He then opens a main air valve supplying air to all of the valve controlled cylinders on the machine and closes the main switch to all of the switch controlled motors, electro-magnets and solenoids. The elevator platform being in a position to close switch 111 at the rear edge of plate 28, Fig. 3, the motor 100, through suitable holding relays, is energized in a direction to raise the platform with its few trays until the topmost tray engages switch 116 to control the holding relays to effect stoppage of the motor 100. At this time the tray lips 126 have lifted above the catches 120 of the tray lift fork 123, Fig. 1, ready for transfer to the indexible rectangular frame 149, Fig. 11. The operator now momentarily closes switch 294 at the right hand end of the rectangular frame after which the machine operates automatically. The closure of switch 294 controls a relay to operate the four way valve to admit fluid pressure to the motor 136 to lift the transfer fork and its supported tray. The tray moves through the tiltable tracks a distance sufficient to allow the tracks 146 to engage beneath the lips 126 on the tray. On the upward motion of the fork, its bridge member 134 closes the switch in block 214 on the inner face of the end plate 150 of the rectangular frame which operates a solenoid to control the reversal of motor 136 to lower the fork, whereby its catches are beneath the lip of the next tray on the elevator platform. Closure of the switch 294 also causes the solenoid 296 to be energized to tilt the square shaft 278 and the fingers 284 and 285 and also the reversal of motor 264 to return the tray transport rack bar 272, its attached switch control plate 288 and the fingers 184 and 185 to the left of the rectangular frame. As the rack bar approaches its left hand position, the pin 302 engages switch 304 to deenergize the finger tilting solenoid 296 and to reverse the rotation of motor 264. The fingers then lock into the recesses 290 in the tray and the motor 264 then drives the rack bar 272 to the right via the friction clutch 255 until the first tooth on the ratchet 254 is engaged by the pawl 250. At the same time the first high tooth on plate 288 engages reversing switch 291 reversing the motor 204 to tend to drive the rectangular frame forward.

When the tray is placed on the tracks, the hole or compartment in the forward right hand corner of the tray is in a position to receive a folded heater wire from the transfer arm 336. On the next swing of the arm to a position over the tray, the tray will have move forwardly one step under control of a cam on the heater winding machine which controls the circuit to the electromagnet 240, Fig. 17, which, in turn, momentarily releases the plunger from the stepped shaft 218 to allow the motor 204 through its friction drive 188 and the gears 180 to advance the rectangular frame forward one step. This stepping forward movement of the rectangular frame continues until all of the holes in a row front to back are filled. After the last hole in the row has been filled and the next forward index occurs, the switch 245 is momentarily closed by the rectangular frame thrusting against the switch plunger 244, thereby momentarily energizing the solenoid 246 to lift the pawl 250 to allow the drive of motor 264 to become effective to shift the rack bar 272 with its fingers 284 and 285 and plate 288 to the right a distance determined by the spacing on the ratchet wheel 254. As the plate 288 moves to the right its first recess between the teeth effects a reversal of switch 291 to reverse motor 204 and cause the same to urge the rectangular frame backwardly. After the last forward hole in the second row back to front has been filled the frame moves backwardly one more step to engage switch 247, which it will be remembered is in parallel with switch 245, to effect a shift of the rectangular frame to the right, whereupon switch plate 288 against reverses the motor 204 to drive the rectangular frame forwardly. This squarewave-like advancing movement of the tray continues until the last hole has been filled on the back indexing movement of the rectangular frame. On the next movement of the tray to the right, the tray engages the stop 309 and the pin 292 on the finger 285 momentarily actuates switch 294 to tilt the rack 272 and move the same and parts carried thereby back to the left so that the fingers 284 and 285 may engage a new tray on the tracks 146 when the solenoid 296 is deenergized. At the same time the switch 294 closes a circuit to energize the motor 136 to lift the fork 123 to place another tray on the tiltable tracks. The rectangular frame with both its unfilled and its filled tray now steps forward till switch tapper 320 projecting through hole 321 in the front member 156 is engaged by the filled tray, thereby momentarily closing the switch 322 to operate the tray unload lift motor 315. This lifts the tray lift 308 to bring the forward and rear lips 126 of the tray above the catches 334 on the framework 328. The arm 336 in the upward movement of the unloading tray lift strikes switch 324, momentarily closing the same to cause it to control the reversal of the valves in the four way air valve 318 to lower the lift for reception of another tray as it is being loaded with heater coils.

The unloading of the trays from the elevator supply platform 76 continues until the last tray has been unloaded therefrom by the transfer fork. When this happens the elevator platform continues to rise till its tapper 108 engages switch 118, reversing the motor 100 to cause the elevator platform to descend, whereupon it strikes the switch plunger 110 on the base plate 28 which in turn controls the admission of air to the motor 53 to cause the yoke 60 and pusher bars 70 to load the elevator with a new load of trays. The inward movement of the yoke causes the pin 63 to engage switch plunger 114 to reverse the motor 100 to drive the platform upwardly until the motor 100 is stopped by engagement of switch 116 by the topmost tray and to reverse the motor 53 to bring the yoke to forward position. This completes the cycle.

What is claimed as new is:

1. A tray handling and stacking mechanism comprising a pair of rails adapted to accommodate a stack of empty trays having in their upper surfaces rows and columns of apertures to receive articles, an elevator platform, means for shifting the stack of trays onto the elevator platform when the same is in lowered position, means under control of the shifting means for raising the elevator until the top tray of the stack reaches a given elevation, a rectangular frame, tracks in said frame, a transfer device for transferring a tray from the top of the stack on the elevator onto the tracks in the rectangular frame, means for indexing the frame laterally in opposite directions, means for indexing a tray longitudinally of the tracks in the frame whereby all of the apertures in the tray may be filled sequentially at a given point while the tray is moving in square wave fashion, means for moving a filled tray into a storage rack, means controlled by the movement of the tray in its translation to the storage rack to effect transfer of another tray from off the empty stack of trays onto the rails in the rectangular frame and means to lower the elevator platform when the last tray has been removed therefrom.

2. A tray handling machine comprising a vertically movable transfer device for removing a tray having rows and columns of apertures in the upper face thereof from a stack of trays and placing it on a pair of parallel tracks mounted in a frame, each track being rotatable about a longitudinal axis eccentric of the cross section of the track, means biasing the tracks so that they rotate to a normal tray supporting position, said transfer device thrusting the tray between the tracks to tilt the same out of normal position to allow passage of the tray therebeween, and said transfer device then withdrawing to allow the tray to rest on the tracks, means for indexing the frame to move the tracks laterally and means to index the tray to move the tray longitudinally of the tracks, all whereby the apertures in the tray may be filled sequentially from a given fixed position above the tray.

3. A tray handling machine comprising a horizontal pair of parallel rails to support a stack of empty trays, an elevator at the end of the rails having a platform movable to a lower position to receive the stack of trays on the rails, a first control means controlling a pusher operative upon a descent of the platform to effect transfer of the stack of trays on the rails onto the platform, a second control means operative as the trays are placed on the platform to control the return of the pusher and the rise of the platform, a third control means engaged by the topmost tray on the platform to arrest the upward motion of the elevator, a frame carrying a pair of tracks above the platform, indexing means for moving a tray longitudinally of the tracks, a transfer device between the elevator and frame, a fourth control means operated by the tray as it reaches a limiting position in its movement on the tracks to control the transfer device to transport a tray from off the stack of trays on the platform onto the tracks, said transporting also controlling the elevator platform so that it again rises until the next tray on the platform engages the third control means, the means for advancing the tray longitudinally of the track being also under control of the fourth control means and reversing the tray moving means to return the tray moving means to an initial position, a fifth control means operative when the indexing means for moving the tray reaches its initial position to reverse the indexing means and a sixth control means operative upon rise of the unloaded elevator platform to effect a descent of the platform.

4. A tray handling machine comprising a horizontal pair of parallel rails to support a stack of empty trays, an elevator at the end of the rails having a platform movable to a lower position to receive the stack of trays on the rails, a first control means controlling a pusher operative upon a descent of the platform to effect transfer of the stack of trays on the rails onto the platform, a second control means operative as the trays are placed on the platform to control the return of the pusher and the rise of the platform, a third control means engaged by the top most tray on the platform to arrest the upward motion of the elevator, a frame carrying a pair of tracks above the platform, indexing means for moving a tray longitudinally of the tracks, a transfer device between the elevator and frame, a fourth control means operated by the tray as it reaches a limiting position in its movement on the tracks to control the transfer device to transport a tray from off the stack of trays on the platform onto the tracks, said third control means, in the absence of a tray, also controlling the elevator platform so that it again rises until the next tray on the platform engages the third control means, a filled tray receiving rack above the frame, a filled tray elevator and motor means for raising the same, said motor means being under control of the fourth control means to cause a filled tray to be removed from the rails and be placed in the receiving rack, the means for advancing the tray longitudinally of the track being also under control of the fourth control means and reversing the tray moving means to return the tray moving means to an initial position, a fifth control means operative when the indexing means for moving the tray reaches its initial position to reverse the indexing means and a sixth control means operative upon rise of the unloaded elevator platform to effect a descent of the platform.

5. In a tray handling mechanism, a platform for holding a stack of trays, a frame above the platform, horizontal tracks mounted in said frame, a transfer device between the platform and frame for removing a tray from off the platform and placing it on the tracks in the frame, means for indexing the frame laterally of the tracks backward and forward, means for indexing the tray on the tracks longitudinally thereof, said tray indexing means including a finger engageable with the tray and an oscillatable guide bar slidably mounting the finger with said finger mounted on the bar to oscillate therewith, driving means for intermittently sliding the finger on the bar to move the tray in one direction, a control means operative upon indexing movement of the tray longitudinally of the rails to effect tilting of the bar and disengagement of the finger from the tray and return of the finger to an initial position where it may engage another tray brought onto the rails by the transfer device, said transfer device also being under control of said control means, and means for removing a tray from the tracks.

6. In a tray handling machine, a support, a frame movable on the support having a pair of longitudinal rails therein, means for loading said rails with a tray having apertures in its top surface arranged in rows and columns, means for indexing said tray longitudinally along the rails and means for indexing said frame laterally, whereby the apertures may all be filled with articles from a fixed point above the tray, said frame indexing means comprising a rod having equally spaced recesses longitudinally thereof mounted on the frame and an electromagnetically controlled plunger operative in an electromagnet fixed to the support engaged in a recess in the rod, drive means for exerting a bias on the frame to move the same, whereby when the plunger is momentarily withdrawn from a recess in the stepped rod the frame will move one step laterally, limit switches engaged by said frame in its movement, means tending to drive the tray longitudinally of the tracks, a pawl and ratchet arrangement arresting such motion, an electromagnet to momentarily release the pawl under control of the limit switches whereby when the frame reaches either lateral limit of its motion the tray will be advanced one step as determined by the ratchet and pawl, a stepped plate movable with the tray in its longitudinal movement and a reversing switch in the path of movement of the plate, said reversing switch being operative to reverse the drive means for the frame for each operation of either limit switch, all whereby all of the apertures in the tray may be loaded from a fixed point above the tray.

7. In a tray handling machine, a support, an elevator mounted on the support for transporting a stack of empty trays, with apertures in its upper face arranged in rows and columns, from a lower to a higher elevation, a transfer device mounted on the support effective to remove a top tray from the stack to a still higher elevation, a laterally indexible frame mounted on the support having tracks to receive said top tray, longitudinal tracks on the frame along which the tray is indexed, whereby as a result of the indexing motions of the frame and tray all apertures within the tray on the tracks can be filled at a fixed point with reference to the support, a tray unloading elevator carried by the frame and having track continuations of the tracks in the frame, to receive a filled tray, a storage rack above the unloading elevator and control means for moving the first elevator, the transfer device, frame, tray and unloading elevator.

References Cited in the file of this patent

UNITED STATES PATENTS

| | | |
|---|---|---|
| 2,069,926 | Read | Feb. 9, 1937 |
| 2,717,729 | Page | Sept. 13, 1955 |